United States Patent
Fujisawa et al.

(10) Patent No.: US 8,305,436 B2
(45) Date of Patent: Nov. 6, 2012

(54) SEPARATION FILTER SELECTION DEVICE AND TIRE INSPECTION DEVICE

(75) Inventors: Yoshitaka Fujisawa, Kodaira (JP); Tomohiro Mizuno, Kodaira (JP); Akinobu Mizutani, Kodaira (JP); Akira Togii, Kodaira (JP); Hirotaka Iino, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 866 days.

(21) Appl. No.: 12/447,178

(22) PCT Filed: Oct. 19, 2007

(86) PCT No.: PCT/JP2007/070456
§ 371 (c)(1), (2), (4) Date: Apr. 24, 2009

(87) PCT Pub. No.: WO2008/050686
PCT Pub. Date: May 2, 2008

(65) Prior Publication Data
US 2010/0026799 A1    Feb. 4, 2010

(30) Foreign Application Priority Data
Oct. 27, 2006  (JP) .................................. 2006-293091

(51) Int. Cl.
*H01N 7/18* (2006.01)
(52) U.S. Cl. .............................. 348/92; 382/152; 73/146
(58) Field of Classification Search .................... 348/86, 348/92; 382/141, 152; 73/146
See application file for complete search history.

(56) References Cited

U.S. PATENT DOCUMENTS
6,680,471 B2 * 1/2004 Kokubu et al. ................ 250/225
(Continued)

FOREIGN PATENT DOCUMENTS
JP     10-106453 A    4/1998
(Continued)

OTHER PUBLICATIONS

Mario Koppen, et al., "Design of image exploring agent using genetic programming", Fuzzy Sets and Systems, 1999, pp. 303-315, 103, Elsevier Science.

(Continued)

*Primary Examiner* — Viet Vu
(74) *Attorney, Agent, or Firm* — Sughrue Mion, PLLC

(57) ABSTRACT

A separation filter selection device provided with an image input unit, a memory unit, a setting unit, an evaluation unit and a separation filter selection unit is disclosed. The image input unit inputs a captured image capturing a tire surface including a characteristic portion thereof. The memory unit stores plural filters for performing image processing of the captured image, stores a training image in which the characteristic portion is separated from the captured image, and a weighted image in which a weighting is set to a predetermined region of the captured image. The setting unit combines two or more filters out of the plural filters and sets a separation filter. The evaluation unit derives an evaluation value of the separation filter on the basis of an image in which a differential between the processed image that has been processed by each of the filters of the separation filter, and the training image, and to which a weighting based on the weighted image is applied. The separation filter selection unit repeats the setting of the setting unit and the evaluation value computation of the evaluation unit until the evaluation value is within a specific range, and selects the separation filter corresponding to the evaluation value resulting from the repeated processing as a separation filter for separating the characteristic portion from the captured image.

18 Claims, 10 Drawing Sheets

U.S. PATENT DOCUMENTS

| | | | |
|---|---|---|---|
| 6,961,445 B1 * | 11/2005 | Jensen et al. | 382/103 |
| 7,260,983 B2 * | 8/2007 | Nosekabel et al. | 73/146 |
| 2005/0058333 A1 | 3/2005 | Kaneko et al. | |

FOREIGN PATENT DOCUMENTS

| | | |
|---|---|---|
| JP | 2002-366929 A | 12/2002 |
| JP | 2003-240521 A | 8/2003 |
| JP | 2006-244031 A | 9/2006 |

OTHER PUBLICATIONS

Kohei Naito, et al., "Automatic Construction of Tree-structural Image Transformations with Auto-modified Teaching Images", ITE Technical Report, 2001, pp. 1-6, vol. 25, No. 24, with English Abstract.

* cited by examiner

SEPARATION FILTER SELECTION DEVICE AND TIRE INSPECTION DEVICE

TECHNICAL FIELD

The present invention relates to a separation filter selection device for dividing up a tire surface into regions, and to a tire inspection device for inspecting the surface structure of a tire.

RELATED ART

With regard to surface defects of bodies subject to detection (detection bodies) such as tires, various techniques are known for defect detection by frequency analysis of the undulating waveform of the surface profile obtained by displacement sensors. Techniques using high speed Fourier transformation are generally known for such frequency analysis. In such methods, while it is possible to remove noise from the measured data, and to extract the defect portion (identify the defect position), identifying the position thereof is difficult with such high speed Fourier transformation. Therefore, a technique is known (see, for example, Patent Document 1) in which displacement of the external surface of the tire is detected by a sensor, and a waveform is obtained by wavelet processing of this displacement signal, which is the output signal from the sensor. Tire defects are detected by comparing the obtained waveform with that of a defect waveform.

In comparison to performing inspection for surface defects, such as in a tire, using a displacement sensor, image processing inspection of a captured image of the surface of a tire or the like is preferable, since image processing inspection approaches the level of visual inspection.

Patent Document 1 Japanese Patent Application Laid-Open No. 10-106453

DISCLOSURE OF THE INVENTION

Problem to be Solved by the Invention

However, methods to obtain surface defects such as of a tire using image processing require elaborate setting of various filters for image processing before performing image processing. These settings are those of a skilled technician. For example, a separation filter configured from a combination of plural filters is required in order to separate a specific region from the surface, such as of a tire, for showing up the surface defects. Selection of these separation filters not only requires a tremendous amount of processing time, but setting of the combination also relies on a skilled operator. Consequently where multiple tire types are present such a technique is not applicable in practice to the inspection of each tire, and it is difficult to simply select the separation filter.

The present invention is made in light of the above considerations and provides a separation filter selection device and a tire inspection device, these enabling high precision inspection of a tire surface.

Method of Solving the Problem

According to a first aspect of the invention, a separation filter selection device is provided including: an image input unit for inputting a captured image of a tire surface, the image including a characteristic portion; a memory unit for storing a plurality of filters for performing image processing of the captured image, storing a predetermined training image that corresponds to an image in which the characteristic portion has been separated from the captured image and that corresponds to an image resulting from image processing of the captured image using the plurality of filters, and storing a weighted image in which a weighting is set to a predetermined region of the captured image; a setting unit for setting as a separation filter a filter group combining two or more filters from the plurality of filters stored in the memory unit; an evaluation unit for performing image processing of the captured image with each of the two or more filters of the separation filter, and calculating an evaluation value of the separation filter on the basis of an image that is a differential image between a processed image after image processing and the training image and to which a weighting based on the weighted image is applied; and a separation filter selection unit for repeating the setting of the setting unit and the evaluation value calculation of the evaluation unit until the evaluation value is within a predetermined specific range, and selecting a separation filter corresponding to the evaluation value resulting from the repeated calculation as a separation filter for separating the characteristic portion from the captured image.

According to the present invention, the filter group combining two or more filters is set as the separation filter and the separation filter is evaluated by calculating the evaluation value from, for example, the difference between the image resulting from image processing of the captured image using the separation filter and the training image. The training image is an image after image processing in which the characteristic portion of the tire, such as a non-knurled portion or knurled portion, is separated. In the calculation of the image differential, the entire image, that is, the entire region of the tire, is evaluated in the same way. Therefore the evaluation preferably derives an evaluation value using a weighted image which is set with a weighting at a predetermined region of the captured image at which separation is desired. Thereby, the region of the captured image at which separation is desired can be evaluated. The setting of the filter group and the evaluation value computation are repeatedly performed until the evaluation value is within the specific range, and, as a result, the separation filter corresponding to the optimal evaluation value, for example, the separation filter with the greatest evaluation value, is selected. In this manner the separation filter for separating the characteristic portion for which separation from the captured image is desired, can be readily selected.

A second aspect of the present invention is the separation filter selection device of the above first aspect, wherein: the memory unit also stores a predetermined weighting coefficient that corresponds to the number of filters in the separation filter; and the evaluation unit derives the evaluation value of the filter group on the basis of the differential image to which the weighting according to the weighted image is applied and of the weighting coefficient corresponding to the number of filters in the set separation filter. In this aspect, the total number of filters used in the separation filter can be taken into consideration by the weighting coefficient corresponding to the number of filters in the separation filter, such as for example using a weighting coefficient that reduces the evaluation value as there is an increase in the number of filters. Consequently the separation filter, suppressing an increase of the image processing load accompanying the increase in the number of filters, can be selected.

A third aspect of the present invention is the separation filter selection device of the above first aspect or second aspect, wherein the separation filter selection unit treats the evaluation value as being within a specific range after a specific number of repetitions have been carried out, and ends the repetition. In this aspect, since repetitions can be ended at a specific number of times when the evaluation value converges and also when it diverges, the separation filter can be selected upon without wasteful repetitive processing continuing, thereby reducing the computational load.

A fourth aspect of the present invention is the separation filter selection device of the above first aspect to third aspect, wherein the setting unit sets a filter group including an array of filters as the separation filter; and the evaluation unit performs image processing of the captured image in accordance with the filter array sequence of the set separation filter. In this aspect the array of filters included in the separation filter is set, and therefore even in cases where the result differs depending on changes to the sequence of plural filters, the corresponding separation filter can be selected.

As a result of various investigations by the inventors, attention was drawn to "genetic algorithm methods" used in another field, and to their application to the particular field of tires. After much investigation into the processes of genetic algorithms to be used during image processing for external inspection of tires or the like, a separation filter selection device was specifically established in order to readily select the separation filter. More precisely, a fifth aspect of the present invention is the separation filter selection device of the above fourth aspect, wherein: the setting unit sets a selected separation filter group comprising a first separation filter and a second separation filter as the separation filter, and adds, to the selected separation filter group, a new separation filter generated by crossing the first separation filter with the second separation filter at a specific probability, and/or a new separation filter generated by modifying at least one filter of at least one separation filter included in the selected separation filter group as another filter at a specific probability; the evaluation unit performs image processing of the captured image with each of the separation filters included in the selected separation filter group, and calculates evaluation values for each of the separation filters; and the separation filter selection unit selects, as a selected separation filter group to be used next time in the setting unit, a first separation filter and a second separation filter based on each of the evaluation values calculated by the evaluation unit, repeats the setting of the setting unit and the evaluation value calculation of the evaluation unit for the next selected separation filter group a prescribed number of times, and selects the separation filter based on the evaluation value resulting from the repeated calculation.

According to the present invention, selected separation filter group is set with a first separation filter and a second separation filter as the separation filter. One or more filter of these separation filters is crossed, exchanging or more filters thereof, or some of the filter(s) is/are modified to other filter(s). Modifying to another filter refers to "mutating", including dropping a filter, substituting, and adding. The separation filter to which crossing or mutation has been carried out is added to the selected separation filter group, and the selected separation filter group for the next time is selected therefrom. By repeating this process a prescribed number of times, the separation filter for the generation corresponding to the prescribed number of times can be selected.

A sixth aspect of the present invention is the separation filter selection device of the fifth aspect, wherein the separation filter selection unit sets the selected separation filter group to be used next time in the setting unit such that the first separation filter and the second separation filter are selected at a probability corresponding to the size of each of the evaluation values derived by the evaluation unit. In this aspect when setting the selected separation filter group for the next generation, by selecting the first separation filter and the second separation filter with a selection probability in accordance with the size of each of the evaluation values, culling can be executed in which a chance can be given for selection both of a separation filter that accords with the evaluation value and a separation filter that does not accord with the evaluation value.

A seventh aspect of the present invention is the separation filter selection device of the fifth aspect or of the sixth aspect, wherein the separation filter selection unit sets the selected separation filter group to be used next time in the setting unit such that the separation filter with the largest evaluation value derived by the evaluation unit is selected as the first separation filter or as the second separation filter. In this aspect, since the separation filter with the largest the evaluation value is always selected, the separation filter can be selected while protecting the separation filter of the optimal filter array that achieves the largest evaluation value, namely protecting the "elite genes".

The separation filter selected by the separation filter selection device is particularly suitable for tire inspection, and is applicable to tire inspection with the following tire inspection device. More precisely, the tire inspection device of an eighth aspect of the present invention is provided with: a memory unit for storing an array of the separation filters selected by the separation filter selection device of claim 1 and for storing filters configuring the separation filters; an imaging unit for imaging the surface of a tire; an image processing unit for performing image processing of an image captured by the imaging unit in accordance with the separation filters stored in the memory unit; and a display unit for displaying results of the processing by the image processing unit.

Effect of the Invention

According to the present invention, as explained above, since an evaluation value of the separation filter is derived by applying the weighting to the differential image between the processed image after image processing with the separation filter and the training image, and repetition is made until the evaluation value is within a specific range, an excellent result is exhibited in that a separation filter for separating the characteristic portion for which separation from the captured image is desired, can be readily selected.

BEST MODE OF IMPLEMENTING THE INVENTION

Explanation will now be given of details of an exemplary embodiment of the present invention, with reference to the drawings. The present exemplary embodiment is an application of the present invention to a tire external appearance inspection.

Device Configuration

Figure 1:
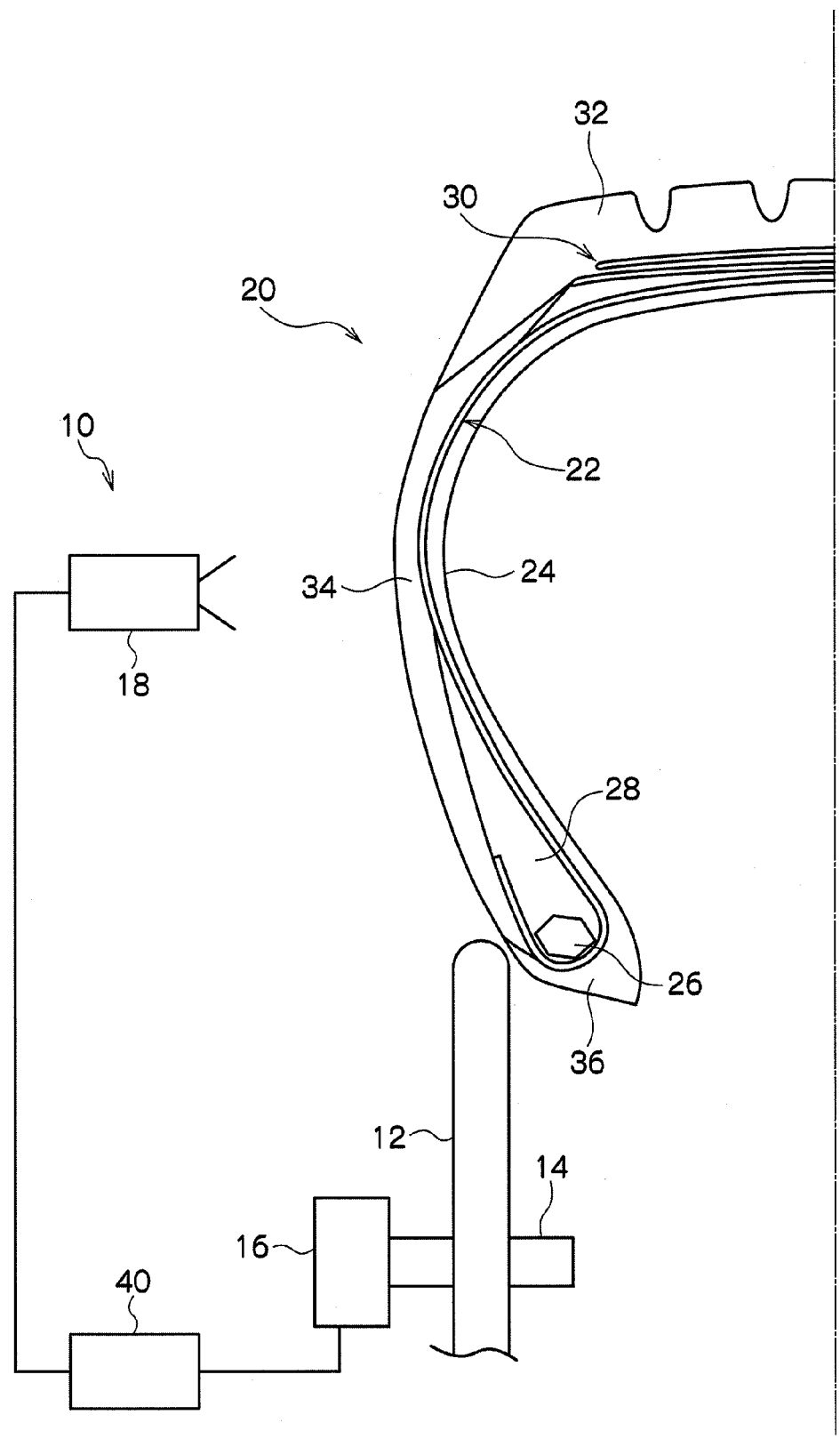
FIG. 1 is a schematic configuration diagram of a tire inspection device according to an exemplary embodiment of the present invention.

FIG. 1 shows a fitted state of a tire 20 (shown in cross-section) subjected to inspection by a tire inspection device 10 according to an exemplary embodiment of the present invention. The tire inspection device 10 is provided with holders 12 for holding the tire 20. The holders 12 perform a similar role to a wheel for actual fitting of the tire 20. The holders 12 are configured with a pair of circular disk portions that are disposed facing each other and parallel to each other (only one side is shown in FIG. 1). A rotational axis holder 14 is attached at the center of one of the holders 12, the rotational axis holder 14 being connected to the rotational axis of a motor 16. The motor 16 is connected to a controller 40.

A camera 18 for imaging the outer surface of the tire 20 is connected to the controller 40. Explanation will be given of the camera 18 in the present exemplary embodiment of a case where the camera 18 is placed so as to be able to image the outer surface of the tire 20, however there is no limitation to such placement of the camera 18, and placement may be made such that imaging of an inner portion of the tire 20 is possible. The motor 16 is driven according to an instruction signal from the controller 40, such that the holder 12 and the camera 18 can be relatively rotated with respect to each other. The entire circumference of the tire 20 is thus able, by this configuration, to be imaged with the camera 18.

The tire 20 is configured with a carcass 22 that partitions each of plural rubber members, with the carcass 22 folding back on itself around a bead 26. Various types of cord are contained within the carcass 22. An inner liner 24 is disposed on the inside of the carcass 22, and a bead rubber 36 is disposed extending from the inner liner 24. A substantially triangular shaped region formed by the folded-back carcass 22 is configured by a bead filler 28. A belt 30 is disposed above the carcass 22, a tread rubber 32 having grooves formed therein is disposed on the outside of the belt 30 in the radial direction, and a side rubber 34 is disposed on the outside in the axial direction of the carcass 22.

Figure 2:
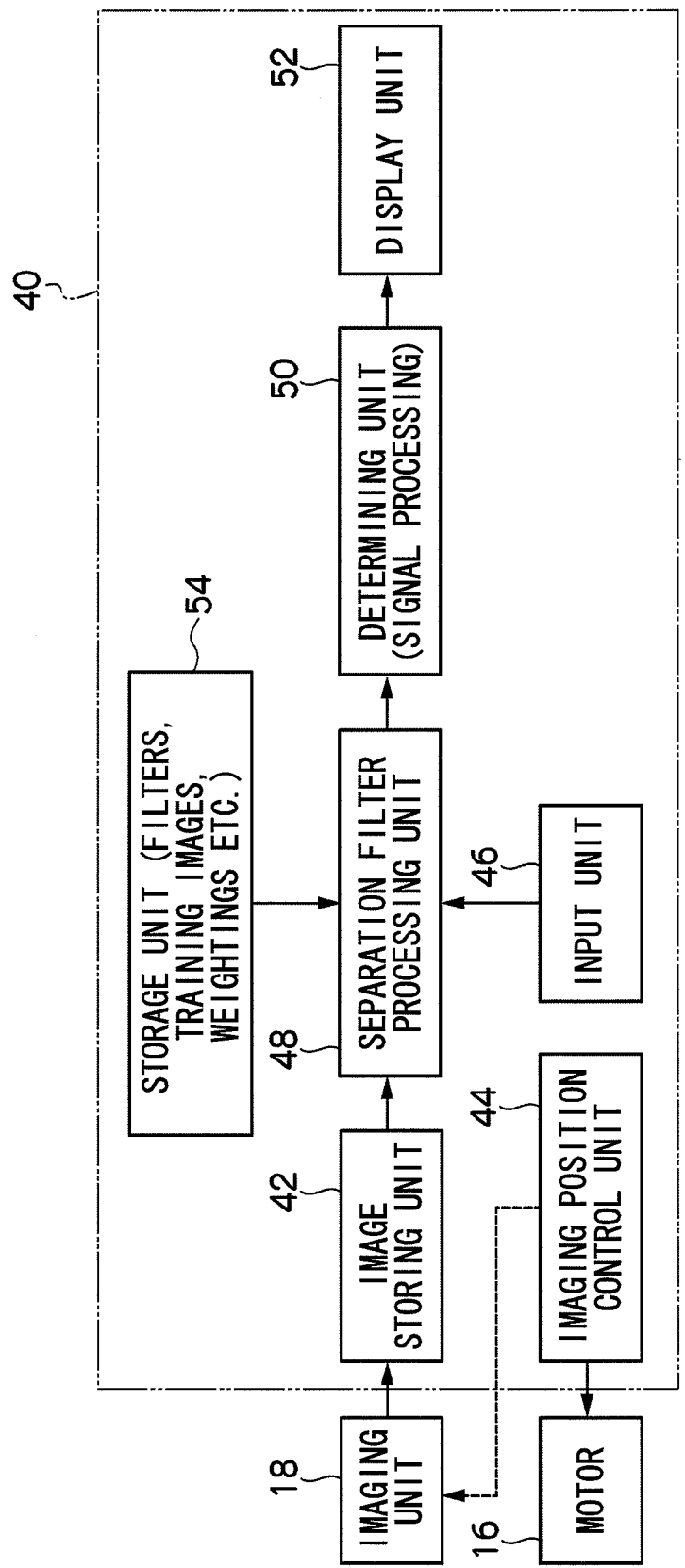
FIG. 2 is a block diagram showing a schematic configuration of a controller of a tire inspection device according to an exemplary embodiment of the present invention.

As shown in FIG. 2, the motor 16 is connected to an imaging position control unit 44 provided to the controller 40, and the rotational position for imaging within the tire 20 is controlled. The controller 40 is a computer configuration including a non-illustrated CPU, ROM, and RAM as hardware resources, and the controller 40 of the computer configuration is shown in FIG. 2 as a later described processing program software resource including separate functional blocks.

The processing program for executing various processes, for later described image processing, separation filter selection processing and tire inspection, is stored in the non-illustrated ROM of the controller 40. A flexible disk unit (FDU), capable of insertion with a flexible disk as a recording medium, can also be provided to the controller 40. The above processing program and the like can be read from a flexible disk using the flexible disk unit. Consequently the processing program can be recorded on a flexible disk in advance and the processing program recorded on the flexible disk may be executed through the flexible disk unit. A high capacity storage device (not shown in the figures), such as a hard disk drive or the like, may also be connected to the controller 40, so that the processing program can stored (installed) on the high capacity storage device (not shown in the figures) for execution. If an optical disk, such as a CD-ROM, DVD or the like, or a magneto-optical disk such as an MD, MO or the like, is used as a recording medium then a corresponding device may be used in place of, or in addition to, the above flexible disk unit.

The imaging position control unit 44 of the controller 40 is also connectable (shown as an intermittent line in FIG. 2) to the camera 18, serving as an imaging unit. Namely, imaging by the camera 18 is instructed in synchronization with control of the motor 16 by the imaging position control unit 44. If it is possible to image the tire radial direction outer surface of the tire 20 with the camera 18 at a single time, then it is possible to image the tire 20 around the entire circumference thereof without relatively rotating the tire 20 with respect to the camera 18. However, if the imaging region of the camera 18 is limited, and it is not possible to image the tire radial direction of the tire 20 at a single time, then the imaging region needs to be moved. For example, processing is necessary to match together images captured while rotating the tire 20. In such cases, images of the tire surface captured in circular ring shapes are preferably converted into long belt shaped images, in order to simplify image processing. The obtained slit shaped images can then be matched together according to rotation.

The camera 18, serving as an imaging unit, is connected to an image storing unit 42 provided to the controller 40. The image storing unit 42 is configured to temporarily store images captured by the camera 18, and to output the stored captured image as an image signal. The output side of the image storing unit 42 is connected to a separation filter processing unit 48 so that the image signal output from the image storing unit 42 can be input thereto.

The separation filter processing unit 48 is a functional unit for executing separation filter selection processing, as explained in detail below, and performing image processing during tire inspection. The output side of the separation filter processing unit 48 is connected to a determination unit 50 to which the processing result can be input. An input unit 46 is also connected to the separation filter processing unit 48, enabling input thereto of an input signal from a user, using a keyboard or the like. A storage unit 54 stored with various types of data, such as plural filters, training images, and weightings used for image processing, is also connected to the separation filter processing unit 48. The determination unit 50 is a functional unit for defect determination processing and the like, using an image signal of processing results from the separation filter processing unit 48. The output side of the determination unit 50 is connected to a display unit 52 for displaying a processed signal from the determination unit 50, namely for displaying computation results and the like. The storage unit 54 corresponds to the storage unit of the present invention.

The separation filter processing unit 48 of the present invention uses a separation filter configured from a combination of plural filters for tire inspection to inspect defects and the like in the knurled portion. This separation filter is selected, and tire inspection is performed using the selected separation filter. Selection of the separation filter and inspection of the tire using the separation filter have substantially the same functional configuration, and are executed in the controller 40. Separate explanation will be given of the respective functions thereof from the standpoint of separation filter selection and the standpoint of tire inspection.

Figure 3:
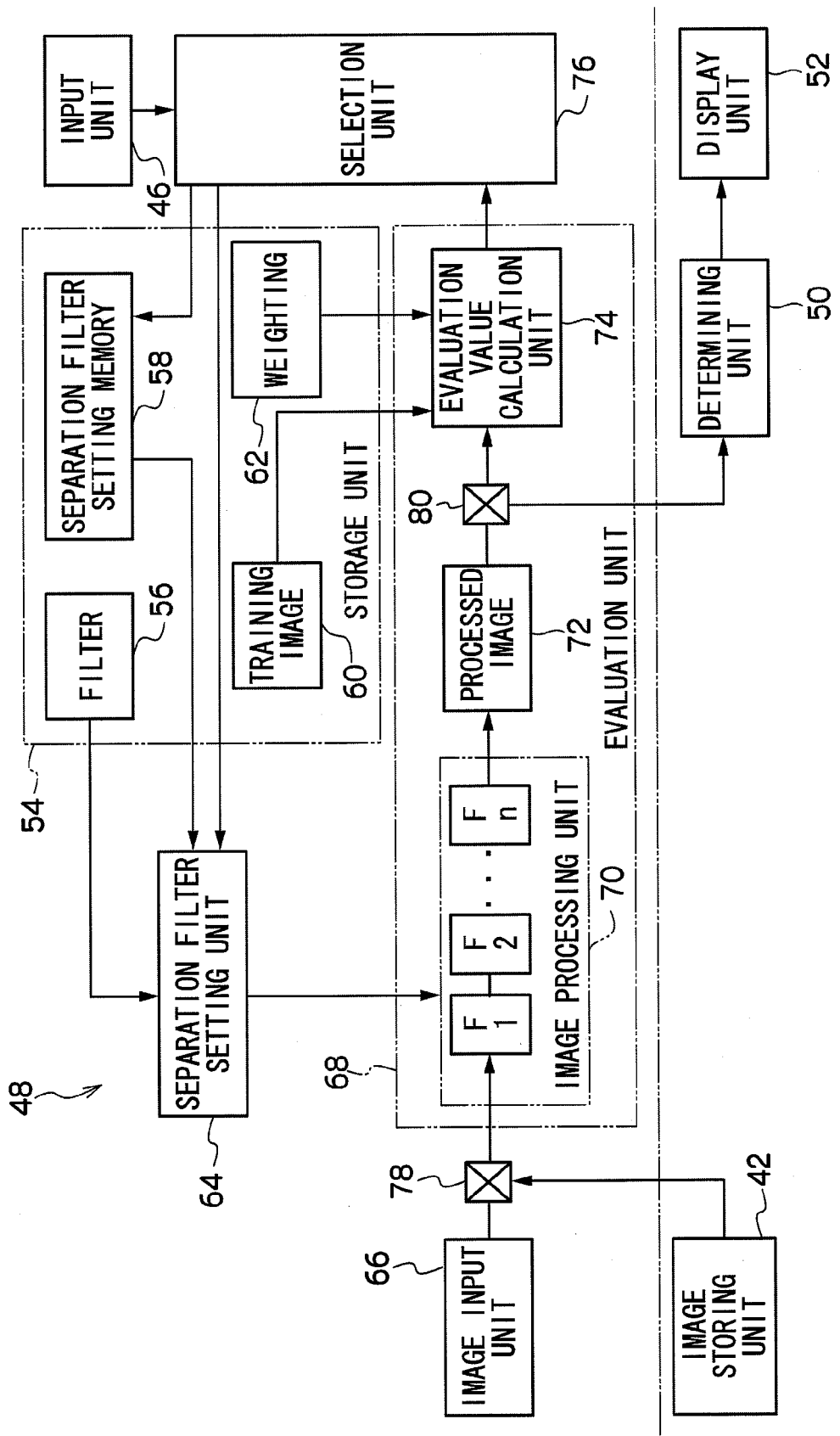
FIG. 3 is a block diagram showing a schematic configuration of a separation filter processing unit.

As shown in FIG. 3, the storage unit 54, connected to the separation filter processing unit 48, is configured to include: a filter region 56 for storing filters for various types of image processing; a separation filter setting memory region 58, for storing a filter array configured from separation filters; a training image region 60 for storing training images; and a weighting region 62 for storing weightings as numerical values.

The data stored in the filter region 56 is generically referred to as a filter, for example, a processing module (for example a function) for performing a given processing on each image pixel in a graduated image, so that this image processing can be performed on an image by calling up the filter. Examples include processing modules for performing various processing such as binarization, conversion to multi-values, maximum-minimum, enlargement and reduction, inversion, elimination of isolated points, first derivative in the x-axis (vertical) direction, first derivative in the y-axis (horizontal) direction, second derivative in the x-axis (vertical) direction, second derivative in the y-axis (horizontal) direction, emphasis in the x-axis (vertical) direction, emphasis in the y-axis (horizontal) direction, edge emphasis, smoothing, etc. Threshold values can be set for each of these processing modules, and processing modules for each of the set threshold values can be stored in the filter region 56 as different filters. In the explanation below, a filter will be represented by filter $F_i$ ($1 \leq i \leq n$: where n is the total number of processing modules).

The data stored in the separation filter setting memory region 58 represents the combination of filters for configuring the separation filter VF selected as described below and an array thereof. For example, "F1, F3, F7, F5" is stored when the separation filter VF is configured from 4 individual filters F1, F3, F7 and F5. The separation filters VF can be represented as $VF_j$ ($1 \leq j \leq m$: where m is the total number of filter combinations) in order to distinguish between the combinations of filters in the separation filters VF.

Data stored in the training image region 60 is image data of training images (see, for example FIG. 6B) used during selection of the separation filter VF as described later. The training images are images in which a characteristic portion of the tire has been separated, as images obtained after performing image processing of an input image. These characteristic portions are non-knurled portions, knurled portions etc. of the tire.

The data stored in weighting region 62 is image data of weighted images, and coefficient data representing a weighting of filter length. The weighted images are images for applying a weighting to predetermined regions, as regions in which high precision inspection is required during tire inspection (see, for example FIG. 6C). These weighted images are preferably determined so as to correspond to the tire used when selecting the separation filter VF as described later. The weighting of filter length is numerical data that varies according to the total number of filters for configuring the separation filter VF selected as described below. This numerical data is determined in advance so as to increase to a maximum when the total number of filters becomes a specific number (for example 4 individual filters), and to get decrease as the number gets smaller.

The separation filter processing unit 48, connected to the above storage unit 54, is configured from a separation filter setting unit 64, an image input unit 66, an evaluation unit 68, and a selection unit 76. The separation filter processing unit 48 corresponds to the separation filter selection device of the present invention, the separation filter setting unit 64 corresponds to the setting unit, the image input unit 66 corresponds to the image input unit, the evaluation unit 68 corresponds to evaluation unit and the selection unit 76 corresponds to the separation filter selection unit.

The separation filter setting unit 64 is a functional unit for setting a plural filter array configured from separation filters VF for separating a characteristic portion, such as a knurled portion, from the input image according to instruction from the selection unit 76. The input side of the separation filter setting unit 64 is connected to the filter region 56 and the separation filter setting memory region 58 of the storage unit 54, and connected to the selection unit 76, and the output side thereof is connected to an image processing unit 70.

The separation filter setting unit 64 includes functionality for executing processing to generate a novel separation filter by crossing and mutating the separation filters VF in order to execute separation filter generation in accordance with a genetic algorithm, described in detail later.

The evaluation unit 68 is a functional unit for evaluating separation filters set in the separation filter setting unit 64 for separating characteristic portions desiring separation from the captured image. The evaluation unit 68 includes the image processing unit 70, a processed image memory 72, and an evaluation value computation unit 74. The image processing unit 70 configuring the evaluation unit 68 is configured so as to be connectable through a switching unit 78 to the image input unit 66 or to the image storing unit 42. The processed image memory 72 is configured so as to be connectable through a switching unit 80 to the evaluation value computation unit 74 or to the determining unit 50.

The switching units 78, 80 are functional units for controlling switching according to the selection unit 76. The selection unit 76 transitions, according to an input value of the input unit 46, to either a selection mode for selecting the separation filter or an inspection mode for executing tire inspection. The switching units 78, 80 are controlled according to this mode. In the selection mode the switching unit 78 switches to perform the required connection of the image input unit 66 to the image processing unit 70 and the switching unit 80 switches to perform the required connection of the processed image memory 72 to the evaluation value computation unit 74. On the other hand, in the inspection mode the switching unit 78 switches to perform the required connection of the image storing unit 42 to the image processing unit 70 and the switching unit 80 switches to perform the required connection of the processed image memory 72 to the determining unit 50.

The image input unit 66 is for inputting an image such as a tire surface (see, for example FIG. 6A) when selecting the separation filter, and the input images may be stored in advance in the storage unit 54 instead of in the image storing unit 42.

Figure 6A:
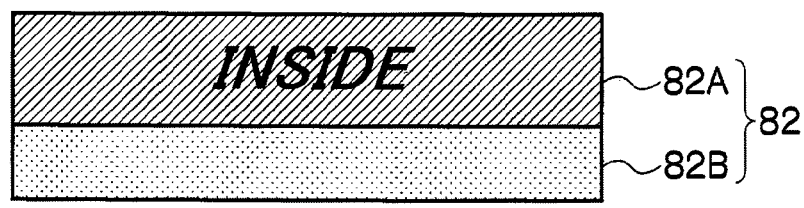
FIG. 6A is a diagrammatic image showing an image for use in a tire inspection device according to an exemplary embodiment of the present invention, an input image is shown.

The image processing unit 70 is a functional unit for performing the image processing of an image input according to the separation filter VF of the group of filters of the array set by the separation filter setting unit 64, and image data after processing is stored in the processed image memory 72. An example of a processed image stored in the processed image memory 72 is shown in FIG. 6D.

The evaluation value computation unit 74 is a functional unit for calculating the evaluation value of the separation filter, and the input side of the evaluation value computation unit 74 is connected to the training image region 60, the weighting region 62, and the selection unit 76. Explanation will be given in the present exemplary embodiment where the evaluation of the separation filter VF is high as the evaluation value increases. The computation of evaluation value can be derived according to the evaluation function g shown in the following Equation 1. This evaluation function g is the sum of the numerical values derived for each of the plural pixels, formed by dividing the image vertically and horizontally, in the case when the image is an 8 bit graduated image.

$$g(VF)=1.0-k\cdot[\Sigma\{(Gw/255)\cdot|Gt-Gc|\}/(255\cdot Vs\cdot Hs)] \quad (1)$$

Wherein:

VF is an identifier representing the separation filter subjected to evaluation k is a weighting coefficient determined by the filter length Gw is a brightness value of a specific pixel of the weighted image Gt is the brightness value of a specific pixel of the training image Gc is the brightness value of a specific pixel of the processed image Hs is the number of pixels in the horizontal direction of the image (the horizontal direction size)

Vs is the number of pixels in the vertical direction of the image (the vertical direction size)

In the large square brackets in the above equation the numerator term is derived from the difference between the training image and the processed image, and corresponds to a computation in which a weighted image is applied to this difference (a computation of obtaining each of the pixels included in the image and totalling them). The denominator term is a coefficient to normalize the size and number of gradations in the image. A weighting coefficient determined by the filter length is applied to this calculation result and then subtracted from 1.0, enabling a higher evaluation value to be derived for a separation filter as the derived value increases.

The selection unit 76 is a functional unit for selecting the separation filter VF according to the evaluation value of the evaluation unit 68, and for performing the image processing using the existing VF. The input side of the selection unit 76 is connected to the input unit 46 and to the evaluation unit 68, and the output side thereof is connected to the separation filter setting unit 64 and the separation filter setting memory region 58. When a mode indicator value is input from the input unit 46, the selection unit 76 transitions to the selection mode or the inspection mode, and the switching units 78, 80 switch connections so as to correspond with this mode (in the selection mode the image input unit 66 is connected to the image processing unit 70 and the processed image memory 72 is connected to the evaluation value computation unit 74, in the inspection mode the image storing unit 42 is connected to the image processing unit 70 and the processed image memory 72 is connected to the determining unit 50).

The selection unit 76 selects the separation filter VF according to the evaluation values of the evaluation unit 68 when in the selection mode, and stores this result in the separation filter setting memory region 58. Setting of the separation filter is instructed to the separation filter setting unit 64 during repeated processing. However, when in the inspection mode the separation filter setting unit 64 is instructed to perform setting such that the separation filter setting unit 64 sets the separation filter VF that has already been stored in the separation filter setting memory region 58.

Explanation will now be given of operation of the tire inspection device 10 configured as described above and of the action of the present exemplary embodiment. In the tire inspection device 10 of the present exemplary embodiment, operation for executing processing to select the separation filter to be used in tire inspection, for inspecting such as for defects in the knurled portion, is different from operation for executing processing to carry out tire inspection using this separation filter. Explanation will be given of executing this processing in the controller 40, corresponding to the mode moved through by the selection unit 76 (FIG. 3), with explanation in sequence from separation filter selection from the standpoint of the selection mode, and then tire inspection from the standpoint of the inspection mode.

Explanation will be given of one example of selection of a separation filter for use in inspection for defects occurring in the knurled portion and in the non-knurled portion of a tire surface, and of tire inspection using this separation filter.

Separation Filter Selection

Explanation will first be given of image processing of the tire surface in the process in the controller 40 for selecting the separation filter, with reference to FIG. 6. FIG. 6A shows a portion of a region of the side face of the tire 20 in an input image 82, which is a captured image. The input image 82 is made up from a knurled portion 82A and a non-knurled portion 82B, and there are sometimes letters or a design included in the knurled portion 82A (a letter motif in the example in FIG. 6A). Sometimes defects occur in the tire surface, such as defects in the letters and design, coupled with protrusions and indentations, cuts etc. The defect state of these defects is different for each of the regions of the tire surface, the knurled portion 82A and the non-knurled portion 82B. Therefore image separation into the knurled portion 82A and the non-knurled portion 82B is necessary in order to raise the precision of inspection. In the present exemplary embodiment the separation filter for separating the tire surface into the knurled portion and the non-knurled portion is selected, and inspection is carried out with an image in which the tire surface is divided into regions using this separation filter. It is possible to detect letter motifs and design motifs using separate processing, and detailed explanation thereof is omitted.

Figure 6B:
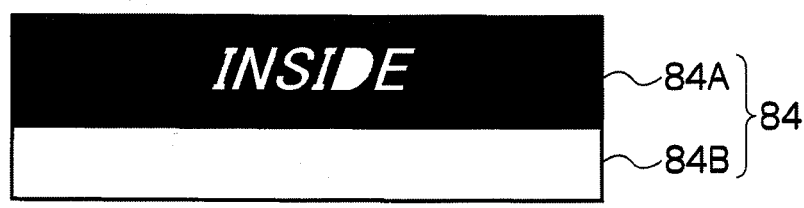
FIG. 6B is a diagrammatic image showing an image for use in a tire inspection device according to an exemplary embodiment of the present invention, a training image is shown.
Figure 6C:
FIG. 6C is a diagrammatic image showing an image for use in a tire inspection device according to an exemplary embodiment of the present invention, a weighted image is shown.
Figure 6D:
FIG. 6D is a diagrammatic image showing an image for use in a tire inspection device according to an exemplary embodiment of the present invention, a processed image is shown.

The example shown in FIG. 6A to FIG. 6D is an example in which a binary value image is obtained after image processing in order to divide the image into the knurled portion 82A and the non-knurled portion 82B. A training image 84 shown in FIG. 6B is an image which should be obtained after image processing of the input image 82. In the image processing unit 70 processing is performed so as to obtain, as a result of image processing of the input image 82, an image equivalent to that of training image 84; however, since the surface state at each of the pixel regions is different, this is taken into consideration by applying the weighted image 86 shown in FIG. 6C for regions requiring increased precision of inspection. The weighted image 86 of the example in FIG. 6C is a graduated image, with graduation values set such that there is a heavy weighting in a non-knurled portion 86B, a light weighting in a knurled portion 86A, and the lightest weighting in the letter motif within the knurled portion 86A. A processed image 88, in which it is possible to distinguish between the knurled portion 82A and the non-knurled portion 82B as shown in FIG. 6D, is obtained by determining an array of plural filters using the training image 84 and the weighted image 86 and by performing image processing.

Figure 4:
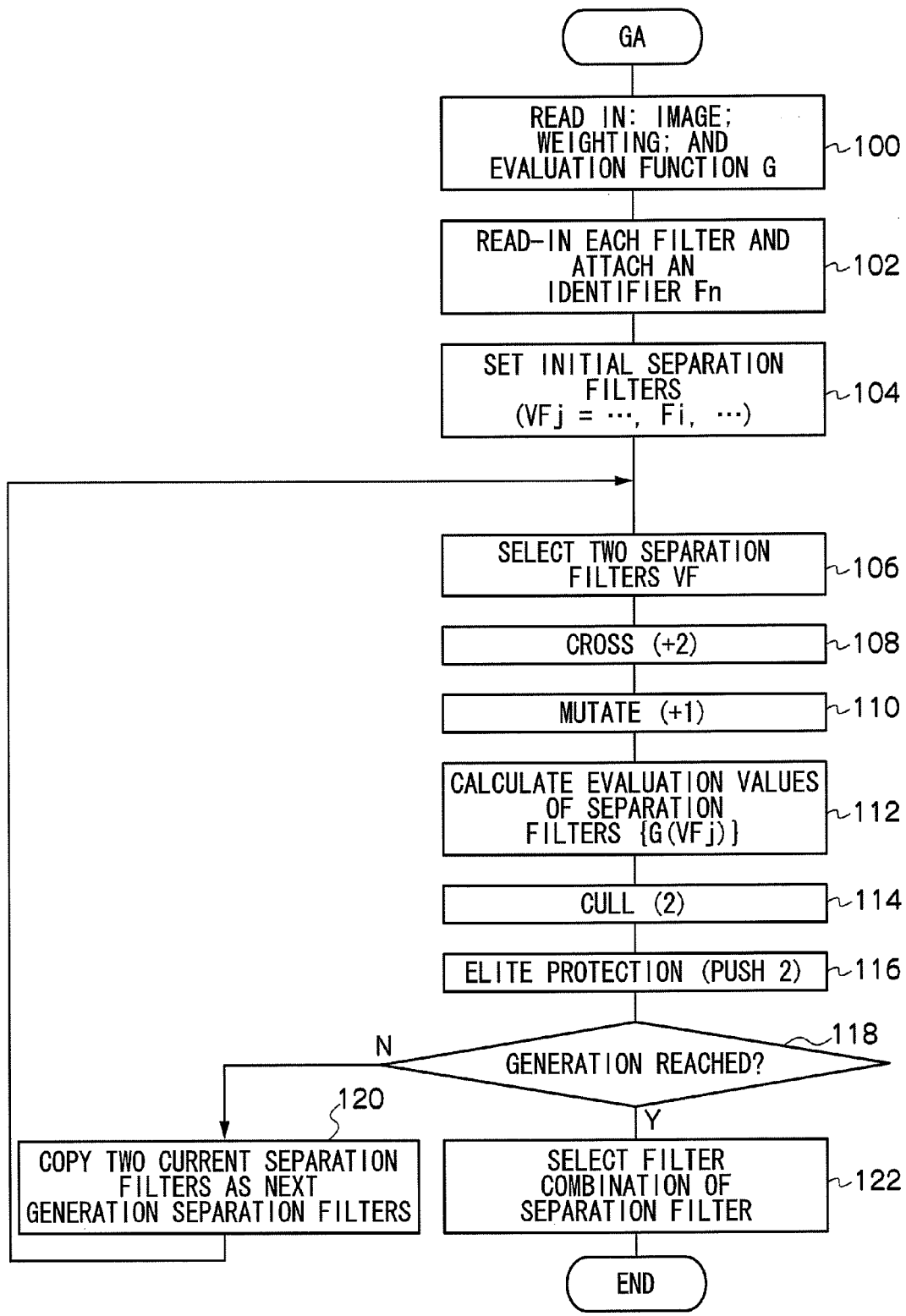
FIG. 4 is a flow chart showing a flow in separation filter processing.

FIG. 4 shows a processing flow of processing in the controller 40 related to separation filter selection processing by execution according to a genetic algorithm. Power is first switched on at the controller 40, user instructions from the input unit 46 are provided to the selection unit 76, and when the mode corresponding to the input value is the selection mode, the selection unit 76 transitions to the selection mode, and the processing of FIG. 4 is started. Explanation will be given of input from the image input unit 66 of an image used for separation filter selection; however, imaging by the camera 18 may be used. In such a case, along with placing the tire 20 having the knurled portion and the non-knurled portion of tire surface in the tire inspection device 10 as a sample for selecting the separation filter, the imaging position including the knurled portion and the non-knurled portion of the tire surface is also set within the image capture range of the camera 18.

At step 100, various data (such as, for example, the training image shown in FIG. 6B, the input image shown in FIG. 6A, the weighted image shown in FIG. 6D, the evaluation function g according to Equation 1 above, and the weighting coefficient k) are read in for use as the initial values in the controller 40. This data is required for executing the processing of the separation filter setting unit 64, image input unit 66, evaluation unit 68 and selection unit 76, and is the minimum amount of data required.

Next, in steps 102 to 106, a first separation filter and a second separation filter are set for execution of the genetic algorithm processing. This processing is performed in the separation filter setting unit 64. First, at step 102, each type of filter F is read in and identifiers Fi ($1 \leq i \leq n$: where n is the total number of processing modules) are allocated thereto. This processing is equivalent to generating a table (for example a table of filter names and identifiers) in order to distinguish between plural filters F stored in the filter region 56.

Next, in step 104, plural settings are made to the initial separation filter. In order to distinguish between these separation filters VF these are denoted by as separation filters VFj ($1 \leq j \leq m$: where m is the total number of filter combinations). The initial separation filter may be one derived in advance by experimentation, for example an array of plural filter combinations, and may be read in when known in advance. In such a case, the initial array may be stored in the storage unit 54. In the next step 106, plural initial separation filters are stored as a group of mother filters, and two filters from this group of mother filters are selected and set as the selected separation filter group. In the explanation below, the separation filters VF for executing genetic algorithm processing are denoted for convenience as a first separation filter VF1 and a second separation filter VF2. Therefore VF1 and VF2 are stored at this stage as the selected separation filter group.

When the first separation filter and the second separation filter have been set, processing is performed for crossing at step 108, and mutating at step 110. This processing also is performed in the separation filter setting unit 64. At least one of the processes of step 108 and/or step 110 should be executed, and when the processing of only one of these steps is executed the processing of the other step is omitted. Determination as to whether or not processing is to be performed is determined according to a specific probability set in advance, and the processing is executed.

Further explanation will now be give of the crossing and mutating referred to above.

Crossing is processing in which a some of the plural filters of the selected two separation filters VF1 and VF2 is/are exchanged. First a crossing location u is determined for the first separation filter VF1 and the second separation filter VF2 in accordance with a specific probability (a random number is generated in advance, according to the random number). Next, the number of filters (crossing number v), from the filter Fi of the crossing location u determined for crossing, is derived. This number of filters for crossing may be determined randomly according to a specific probability, or may be determined according to a specific function. After deriving the crossing location u and the crossing number v, the first separation filter VF1 and the second separation filter VF2 are crossed and novel filter arrays, separation filters VF3, VF4, are generated.

For example, explanation will be given of a case where the selected two separation filters have the filter arrays as shown below.

$$VF1=[F11,F32,F27,F15,F10,F25,F12,F31,F28,F19]$$

$$VF2=[F11,F33,F17,F23,F35,F10,F27,F29,F14,F20]$$

When the derived numerical values of crossing location u of the separation filter is "7", namely the $7^{th}$ filter, and the crossing number v is "4", namely all of the filters from the $7^{th}$ onward, then the filters subjected to crossing are as follows.

$$VF1=[F11,F32,F27,F15,F10,F25,(F12,F31,F28,F19)]$$

$$VF2=[F11,F33,F17,F23,F35,F10,<F27,F29,F14,F20>]$$

As a result the novel separation filters VF3, VF4 become as follows.

$$VF3=[F11,F32,F27,F15,F10,F25,<F27,F29,F14,F20>]$$

$$VF4=[F11,F33,F17,F23,F35,F1,(F12,F31,F28,F19)]$$

In the above the filters which are crossed are shown with the symbols ( ) and < >, for convenience.

These generated novel separation filters are added to the selected separation filter group. The selected separation filter group thereby includes, after crossing has been executed four separation filters VF1, VF2, VF3, VF4.

It should be noted that while there is one crossing location in the above example, plural points for crossing or uniform crossing may be used, such as other genetic algorithms shown in Genetic Algorithms (edited by KITANO Hiroaki).

Mutation means making a small change to at least a portion of the separation filters, in order to increase the probability of including the optimal number of filters and separation filters which can be arrayed. As such mutation, a small change is made to at least a portion of the separation filters, and includes processing such as dropping a filter, substituting with another filter, and adding a novel filter.

In mutation, first the separation filter(s) included in the selected separation filter group to be subjected to mutation is/are determined according to a specific probability. Then next, after the location for mutation (mutation location x) has been determined according to a specific probability, the mutation filter (mutation contents y) is determined according to a specific probability. The mutation contents y may be to select, with a specific probability, one or other of the filters already stored in the filter region 56. Explanation will be given of mutation of one separation filter however plural separation filters may be mutated.

For example, when VF4 is determined as the separation filter to be subjected to mutation, and mutation location x is determined "2", namely as the $2^{nd}$ filter, then the separation filter can be identified as below.

$$VF4=[F11,(F33),F17,F23,F35,F10,F12,F31,F28,F19]$$

If the numerical value of the mutation contents y is "50", namely the identifier represents the F50 filter, then separation filter VF5 after mutation becomes as follows.

$$VF5=[F11,<F50>,F17,F23,F35,F10,F12,F31,F28,F19]$$

The generated novel separation filter is added to the selected separation filter group. Thereby, the selected separation filter group includes five separation filters VF at the point when mutation has been executed after crossing, VF1, VF2, VF3, VF4, VF5.

After completing adding the novel separation filter to the selected separation filter group in the above manner, evaluation values are calculated at step 112 in sequence for each of the separation filters in the selected separation filter group. This processing is performed in the evaluation unit 68. The separation filter setting unit 64 sets in sequence the separation filters of the selected separation filter group for the image processing unit 70 of the evaluation unit 68.

In the evaluation unit 68, after the image processing unit 70 has performed image processing of the image of the image input unit 66, in accordance with the set filter sequence of the separation filters, and stored the processed images in the processed image memory 72, the evaluation values are calculated by the evaluation value computation unit 74. In the evaluation value computation unit 74 the evaluation values are derived, according to Equation 1 as an example of the evaluation function g, by applying the weighted image to the differential between the training image and the processed image for each of the pixels and then applying a weighting coefficient according to the number of filters included in the separation filters of the processed image. The evaluation values of each of the separation filters of the selected separation filter group are then output to the selection unit 76.

Then, in step 114 to step 122, the next generation of separation filters is determined based on the evaluation values of each of the separation filters in the selected separation filter group, and optimization is executed so as to determine the final separation filter. This processing is also performed in the selection unit 76.

First, at step 114, there is culling of separation filters in the present generation. This culling is a process of selecting separation filters from the plural separation filters included in the selected separation filter group, selecting with a probability according to the evaluation value. This corresponds to an applicability rating strategy where the evaluation value corresponds to the degree of applicability. Namely, the evaluation values are rated and the probability of selection of the separation filters determined, and two separation filters are selected without discrimination from the plural separation filters according to this probability.

At the next step 116, elite protection processing is executed. This processing constitutes copying the separation filter(s) with the highest evaluation value(s) without modification into the next generation, and may constitute replacement of the two separation filters surviving from the above culling or by replacement of one or the other thereof. When culling processing is not executed then the separation filters with the highest evaluation values within the plural separation filters in the selected separation filter group may be copied without modification into the next generation.

Consequently, identifier data, such as a selection value or the like, is preferably applied in steps 114, 116, in order to make the two separation filters for the next generation identifiable. The evaluation value is input to the selection unit 76 from the evaluation unit 68, and the VFj can be read out so as to identify the separation filter corresponding to the evaluation value. This may be performed so as to input to the selection unit 76 from the separation filter setting unit 64, and correspondence may be made by the evaluation unit 68 between the evaluation value and the VFj and then output.

The processing of the above steps 114 and 116 may be configured to include "tournament strategies". Such strategies constitute processing whereby plural separation filters are selected without discrimination, and the two separation filters with the highest evaluation values among the selected plural separation filters are retained. One or more of the above steps 114, 116 and the tournament strategies may be executed, and when only one is executed the other processing is omitted. Whether or not to perform such processing is determined and executed according to a predetermined specific probability.

In the next step 118 determination is made as to whether or not the current generation (number of repetitions above of step 108 to step 116) has reached a predetermined prescribed generation (for example $200^{th}$ generation). When this predetermined specific generation has not been reached then the two separation filters of which selection has been completed at step 120 are copied as the separation filters for the next generation, and the routine returns to step 106. In this step 120 the two separation filters of which selection has been completed are added to the above group of mother filters. This addition is not limited to increasing the total number of separation filters included in the group of mother filters. For example, along with the addition, a given number of separation filters, which is the same as the number of added separation filters, may be deleted. An example of such a case is to delete the same number of separation filters having the lowest evaluation values as the given number of added separation filters.

However, when the current generation has reached the prescribed generation the determination at step 118 is affirmative, and the optimal separation filter is selected at step 122. The optimal separation filter is obtained by selection of the separation filter with the highest evaluation value from the plural separation filters included in the above selected separation filter group, and is obtained by selecting the separation filter with the highest evaluation values from the separation filters remaining from the above culling and elite protection. At this step 122 the separation filter VF selected is stored in the separation filter setting memory region 58, as a filter array for example.

It should be noted that selecting the optimal separation filter at step 122 is not limited to the plural separation filters included in the above selected separation filter group, and plural separation filters included in the group of mother filters may also be used. Plural separation filters up to the prescribed generation are included in the group of mother filters, and so there is the possibility that the optimal filter remains within the group of mother filters; therefore, the opportunity is given for a separation filter included therein to be selected as the optimal separation filter. An example of such a case is the selection of the separation filter with the highest evaluation value from within the plural separation filters included in the group of mother filters.

The separation filter VF stored in the separation filter setting memory region 58 is thereby a filter array for image processing that can convert the input image 82 into the processed image 88.

Note that affirmative determination may be made at step 118 when any of the following conditions are satisfied. Exemplary conditions include: the greatest evaluation value reaches an evaluation value within a specific range determined in advance; the greatest evaluation value does not change for a specific number of generations; and the evaluation value is a specific portion or less than the greatest evaluation value up to now for a specific number of times in a row.

In the present exemplary embodiment, selecting the separation filter takes into consideration as the weighted image the region of the surface having a characteristic and desired for separation. Thereby a filter combination that can readily separate the desired region for precise inspection can be simply selected. In addition, by taking into consideration the application of a weighting coefficient depending on the number of filters, the evaluation value of the filter is not limited to separation of the image, the filter combination simply selected with consideration to the processing load of image processing.

Note that while explanation has been given of a case of selecting the separation filter VF for the image formed from the knurled portion 82A and the non-knurled portion 82B shown in FIGS. 6A to 6D, this separation filter VF is not one requiring the image and particular type of tire of FIG. 6. Namely, the separation filter for dividing regions from the captured image may be selected, by selecting a filter array configured from the training images 84 for dividing into regions, and the weighted image 86 of the region(s) requiring precision, and separated processed images can be obtained for each region. There is therefore applicability to various tire surfaces. In such cases, distinct letter motifs and design motifs may sometimes be present, however these letter motifs and design motifs are known in advance, and so are readily excluded from regions subjected to inspection during tire inspection as described below.

Tire Inspection

Explanation will now be given of processing of the tire inspection device 10 for defect inspection of an external tire surface, with respect to the tire 20. This processing is defect inspection processing for performing tire inspection using the separation filter selected as described above, and is execute by the processes shown in FIG. 5.

Figure 5:
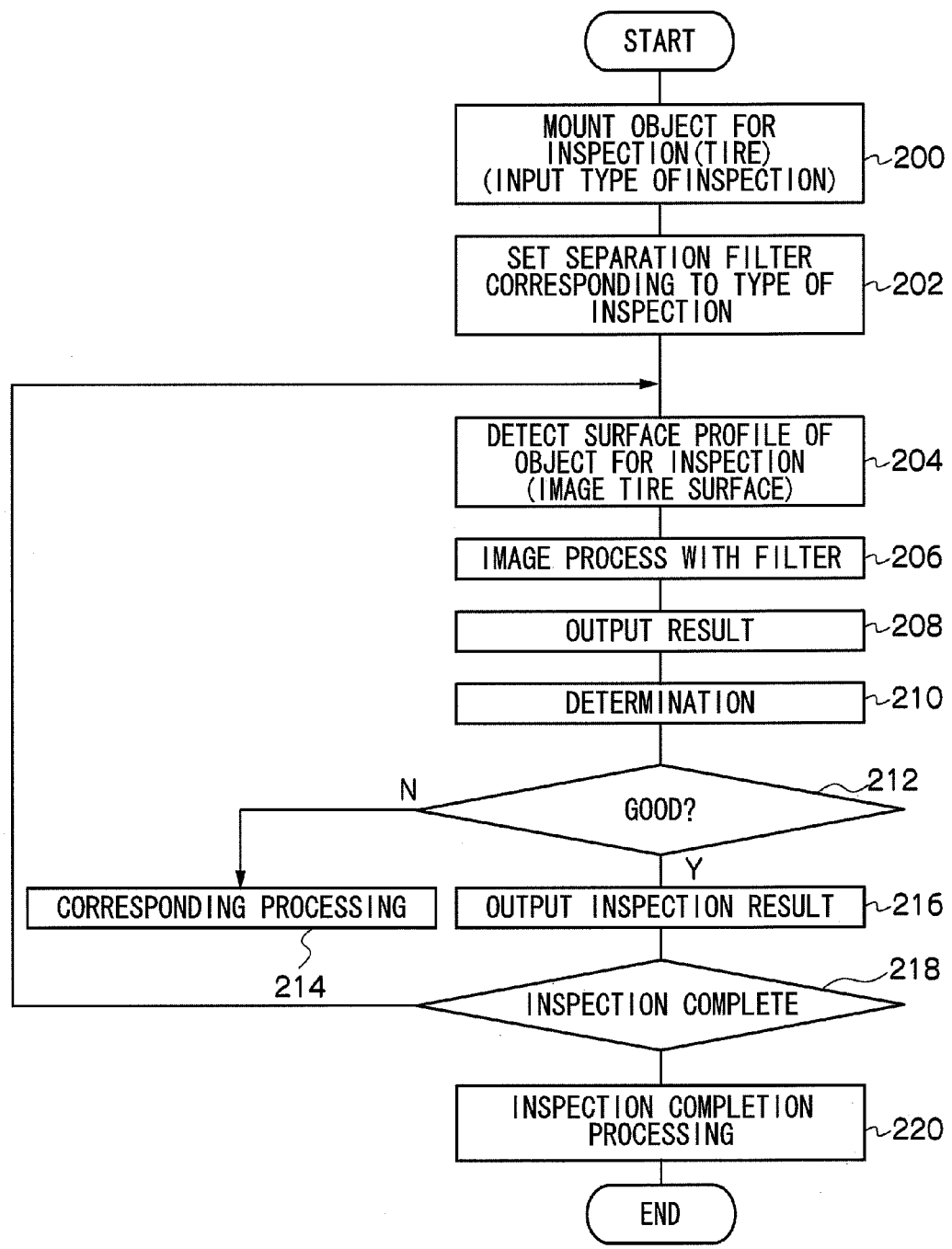
FIG. 5 is a flow chart showing a flow in tire inspection processing according to an exemplary embodiment of the present invention.

FIG. 5 shows a processing flow in tire inspection processing executed in the controller 40. First power is switched on to the controller 40, a user instruction from the input unit 46 is input to the selection unit 76, and when the input value corresponds to the inspection mode the selection unit 76 transitions to the inspection mode, and the processing of FIG. 5 is started.

First the tire 20 having the knurled portion and the non-knurled portion tire surface is mounted in the tire inspection device 10, and when the imaging position including the knurled portion and the non-knurled portion of the tire surface has been set within the image capture range of the camera 18, a user inputs, as the type of inspection, an input value representing image output by performing the image processing for separating the knurled portion and the non-knurled portion, and the routine proceeds to step 202. At this point in time the image captured with the camera 18 is input to the image processing unit 70. At the next step 202 the separation filter VF corresponding to the type of inspection is read from the separation filter setting memory region 58, and is set in the image processing unit 70.

The processing of these steps 200, 202 is executed in the selection unit 76. Namely, in the inspection mode, the selection unit 76 first switches the switching units 78, 80 such that the image storing unit 42 is connected to the image processing unit 70 and the processed image memory 72 is connected to the determining unit 50. The selection unit 76 then controls according to the input value from the input unit 46 such that the separation filter setting unit 64 sets the separation filter VF stored in the separation filter setting memory region 58 in the image processing unit 70. The captured image is thereby processed in sequence along a process path of the image storing unit 42, image processing unit 70, processed image memory 72, determining unit 50 and display unit 52.

Next at step 204, the surface of the tire 20 is imaged by the camera 18, and the image signal is stored in the image storing unit 42, and the surface structure of the tire 20 is detected by reading out the image signal. At the next step 206 in the image processing unit 70 the image signal is processed by each of plural filters configuring the separation filter VF, and at the next step 208 the processing result is output to the processed image memory 72. At the next step 210 defect determination processing is executed according to the image of the processed result. This determination processing is executed in the determining unit 50. The processed image(s) of the image processing result of the image processing unit 70, stored in the processed image memory 72, is input to the determining unit 50. Configuration is also made such that a threshold value of the input unit 46 is also input to the determining unit 50. This threshold value is a reference value (or reference range) for discriminating whether or not a defective portion in the image of the processing result is within a permissible range. The defect detection sensitivity can be adjusted by adjusting this threshold value. This threshold value may be an image for extracting the inspection portion.

Determination is made at the next step 212 as to whether or not, from the determination at step 210, the tire has defects in the tire surface or is a good tire. This determination is dependent on the determination of step 210. When step 212 is a negative determination the routine proceeds to step 214, and the corresponding processing is executed. An example of this corresponding processing is image display indicating to a user that precise inspection is required since there is a defective portion in the surface. Another example thereof is simply indicating to a user that there is a defective portion in the surface. Such indication preferably clearly shows the region of the defective portion on the captured image. However, if the determination at step 212 is affirmative then the routine proceeds to step 216, where an inspection result indicating a good tire is output, and then the routine proceeds to step 218.

At step 218 the determination is made as to whether or not inspection of the whole tire surface, by rotation of the motor 16 by the imaging position control unit 44 including one complete relative rotation with respect to the camera 18, has been completed. When this determination is negative the motor 16 is rotated by the imaging position control unit 44 in order for the adjacent tire surface to be imaged, and the routine returns to step 204, where the above processing is repeated. However, if the determination is affirmative then the routine proceeds to step 220. After executing inspection completion processing, such as notification that the tire inspection has been completed, the current routine is ended.

The present exemplary embodiment thereby detects surface defects in a tire surface using images processed using a separation filter VF configured from a combination of filters selected by a genetic algorithm, consequently surface inspection of the tire 20 can be made with a similar level of precision as that of visual inspection with the eye.

In the present exemplary embodiment explanation has been given of a case of inspection of the surface of the tire 20 as tire inspection, however there is no limitation thereto, and there is applicability to inspection of the surface of objects and appearance inspection of objects.

EXAMPLES

Explanation will now be given of examples of the present invention. The present example, is a test of the processing results from operation of the tire inspection device 10 of the above exemplary embodiment, in which the separation filter VF is generated using each of the input image, training image, weighted image, and then a processed image is obtained when the surface of the same type of tire is inspected using this separation filter VF. Tests of the processing results from processed images obtained when inspecting the surface of another type of tire were also carried out.

Figure 7A:
FIG. 7A is a diagram showing a test result for a particular type of tire surface in the present example, an input image is shown.
Figure 7B:
FIG. 7B is a diagram showing a test result for a particular type of tire surface in the present example, a training image is shown.
Figure 7C:
FIG. 7C is a diagram showing a test result for a particular type of tire surface in the present example, a weighted image is shown.
Figure 7D:
FIG. 7D is a diagram showing a test result for a particular type of tire surface in the present example, a processed image is shown.
Figure 7E:
FIG. 7E is a diagram showing a test result for a particular type of tire surface in the present example, an input image for another type of tire is shown.
Figure 7F:
FIG. 7F is a diagram showing a test result for a particular type of tire surface in the present example, a processed image is shown.
Figure 8A:
FIG. 8A is a diagram showing a test result for another particular type of tire surface in the present example, an input image is shown.
Figure 8B:
FIG. 8B is a diagram showing a test result for another particular type of tire surface in the present example, a training image is shown.
Figure 8C:
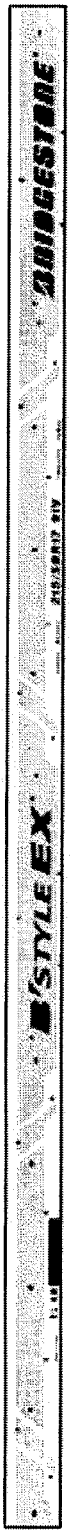
FIG. 8C is a diagram showing a test result for another particular type of tire surface in the present example, a weighted image is shown.
Figure 8D:
FIG. 8D is a diagram showing a test result for another particular type of tire surface in the present example, a processed image is shown.
Figure 8E:
FIG. 8E is a diagram showing a test result for another particular type of tire surface in the present example, an input image for another type of tire is shown.
Figure 8F:
FIG. 8F is a diagram showing a test result for another particular type of tire surface in the present example, a processed image is shown.

FIGS. 7A to 7F show test results of a 225/45R specific type of tire surface. FIG. 7A shows an input image, FIG. 7B shows a training image, FIG. 7C shows a weighted image, and FIG. 7D shows a processed image of a tire surface that has been performed the image processing using a generated separation filter VF. FIG. 7E shows an input image of a tire surface of another type of tire for testing another type of tire using the separation filter VF generated for the specific type, and FIG. 7F shows the processed image thereof. In the same manner, FIGS. 8A to 8F show test results of another specific type of tire surface. FIG. 8A shows an input image, FIG. 8B shows a training image, FIG. 8C shows a weighted image, and FIG. 8D shows a processed image. FIG. 8E shows an input image of a tire surface of another type of tire, and FIG. 8F shows the processed image thereof.

As can be seen from these figures, by generating the separation filter VF from the input image, training image, and weighted image, ready separation is made of the region desired for precise inspection, and ready region separation is possible even for another type of tire surface. Consequently it is clear that rapid tire inspection can be executed with high precision.

EXPLANATION OF THE REFERENCE NUMERALS

10 TIRE INSPECTION DEVICE
16 MOTOR
18 CAMERA
20 TIRE
40 CONTROLLER
48 SEPARATION FILTER PROCESSING UNIT
54 STORAGE UNIT
64 SEPARATION FILTER SETTING UNIT
66 IMAGE INPUT UNIT
68 EVALUATION UNIT
70 IMAGE PROCESSING UNIT
74 EVALUATION COMPUTATION UNIT
76 SELECTION UNIT

The invention claimed is:

1. A separation filter selection device comprising:
an image input unit for inputting a captured image of a tire surface, the image including a characteristic portion;
a memory unit for storing a plurality of filters for performing image processing of the captured image, storing a predetermined training image that corresponds to an image in which the characteristic portion has been separated from the captured image and that corresponds to an image resulting from image processing of the captured image using the plurality of filters, and storing a weighted image in which a weighting is set to a predetermined region of the captured image;
a setting unit for setting as a separation filter a filter group combining two or more filters from the plurality of filters stored in the memory unit;
an evaluation unit for performing image processing of the captured image with each of the two or more filters of the separation filter, and calculating an evaluation value of the separation filter on the basis of an image that is a differential image between a processed image after image processing and the training image and to which a weighting based on the weighted image is applied; and
a separation filter selection unit for repeating the setting of the setting unit and the evaluation value calculation of the evaluation unit until the evaluation value is within a predetermined specific range, and selecting a separation filter corresponding to the evaluation value resulting from the repeated calculation as a separation filter for separating the characteristic portion from the captured image.

2. The separation filter selection device of claim 1, wherein:
the memory unit also stores a predetermined weighting coefficient that corresponds to the number of filters in the separation filter; and
the evaluation unit derives the evaluation value of the filter group on the basis of the differential image to which the weighting according to the weighted image is applied and of the weighting coefficient corresponding to the number of filters in the set separation filter.

3. The separation filter selection device of claim 1, wherein the separation filter selection unit treats the evaluation value as being within a specific range after a specific number of repetitions have been carried out, and ends the repetition.

4. The separation filter selection device of claim 2, wherein the separation filter selection unit treats the evaluation value as being within a specific range after a specific number of repetitions have been carried out and ends the repetition.

5. The separation filter selection device of claim 1, wherein:
the setting unit sets a filter group including an array of filters as the separation filter; and
the evaluation unit performs image processing of the captured image in accordance with the filter array sequence of the set separation filter.

6. The separation filter selection device of claim 2, wherein:
the setting unit sets a filter group including an array of filters as the separation filter; and
the evaluation unit performs image processing of the captured image in accordance with the filter array sequence of the set separation filter.

7. The separation filter selection device of claim 3, wherein:
the setting unit sets a filter group including an array of filters as the separation filter; and
the evaluation unit performs image processing of the captured image in accordance with the filter array sequence of the set separation filter.

8. The separation filter selection device of claim 5, wherein:
the setting unit sets a selected separation filter group comprising a first separation filter and a second separation filter as the separation filter, and adds, to the selected separation filter group, a new separation filter generated by crossing the first separation filter with the second separation filter at a specific probability, and/or a new separation filter generated by modifying at least one filter of at least one separation filter included in the selected separation filter group as another filter at a specific probability;
the evaluation unit performs image processing of the captured image with each of the separation filters included in the selected separation filter group, and calculates evaluation values for each of the separation filters; and
the separation filter selection unit selects, as a selected separation filter group to be used next time in the setting unit, a first separation filter and a second separation filter based on each of the evaluation values calculated by the evaluation unit, repeats the setting of the setting unit and the evaluation value calculation of the evaluation unit for the next selected separation filter group a prescribed number of times, and selects the separation filter based on the evaluation value resulting from the repeated calculation.

9. The separation filter selection device of claim 8, wherein the separation filter selection unit sets the selected separation filter group to be used next time in the setting unit such that the first separation filter and the second separation filter are selected at a probability corresponding to the size of each of the evaluation values derived by the evaluation unit.

10. The separation filter selection device of claim 8, wherein the separation filter selection unit sets the selected separation filter group to be used next time in the setting unit such that the separation filter with the largest evaluation value derived by the evaluation unit is selected as the first separation filter or as the second separation filter.

11. The separation filter selection device of claim 9, wherein the separation filter selection unit sets the selected separation filter group to be used next time in the setting unit such that the separation filter with the largest evaluation value derived by the evaluation unit is selected as the first separation filter or as the second separation filter.

12. A tire inspection device comprising:
a memory unit for storing an array of the separation filters selected by the separation filter selection device of claim 1 and for storing filters configuring the separation filters;
an imaging unit for imaging the surface of a tire;
an image processing unit for performing image processing of an image captured by the imaging unit in accordance with the separation filters stored in the memory unit; and
a display unit for displaying results of the processing by the image processing unit.

13. A tire inspection device comprising:
a memory unit for storing an array of the separation filters selected by the separation filter selection device of claim 2 and for storing filters configuring the separation filters;
an imaging unit for imaging the surface of a tire;
an image processing unit for performing image processing of an image captured by the imaging unit in accordance with the separation filters stored in the memory unit; and
a display unit for displaying results of the processing by the image processing unit.

14. A tire inspection device comprising:
a memory unit for storing an array of the separation filters selected by the separation filter selection device of claim 3 and for storing filters configuring the separation filters;
an imaging unit for imaging the surface of a tire;
an image processing unit for performing image processing of an image captured by the imaging unit in accordance with the separation filters stored in the memory unit; and
a display unit for displaying results of the processing by the image processing unit.

15. A tire inspection device comprising:
a memory unit for storing an array of the separation filters selected by the separation filter selection device of claim 5 and for storing filters configuring the separation filters;
an imaging unit for imaging the surface of a tire;
an image processing unit for performing image processing of an image captured by the imaging unit in accordance with the separation filters stored in the memory unit; and
a display unit for displaying results of the processing by the image processing unit.

16. A tire inspection device comprising:
a memory unit for storing an array of the separation filters selected by the separation filter selection device of claim 8 and for storing filters configuring the separation filters;
an imaging unit for imaging the surface of a tire;
an image processing unit for performing image processing of an image captured by the imaging unit in accordance with the separation filters stored in the memory unit; and
a display unit for displaying results of the processing by the image processing unit.

17. A tire inspection device comprising:
a memory unit for storing an array of the separation filters selected by the separation filter selection device of claim 9 and for storing filters configuring the separation filters;
an imaging unit for imaging the surface of a tire;
an image processing unit for performing image processing of an image captured by the imaging unit in accordance with the separation filters stored in the memory unit; and
a display unit for displaying results of the processing by the image processing unit.

18. A tire inspection device comprising:
a memory unit for storing an array of the separation filters selected by the separation filter selection device of claim 11 and for storing filters configuring the separation filters;
an imaging unit for imaging the surface of a tire;
an image processing unit for performing image processing of an image captured by the imaging unit in accordance with the separation filters stored in the memory unit; and
a display unit for displaying results of the processing by the image processing unit.

* * * * *